United States Patent [19]

Hugelshofer et al.

[11] Patent Number: 4,500,321

[45] **Date of Patent: * Feb. 19, 1985**

[54] PROCESS FOR THE PREPARATION OF CONCENTRATED FLUID DYE COMPOSITIONS

[75] Inventors: Paul Hugelshofer, Muttenz; Beat Bruttel, Böckten; Heinz Pfenninger, Lupsingen, all of Switzerland; Roger Lacroix, Village-Neuf, France

[73] Assignee: Ciba-Geigy Corporation, Ardsley, N.Y.

[ * ] Notice: The portion of the term of this patent subsequent to Jun. 28, 2000 has been disclaimed.

[21] Appl. No.: 468,630

[22] Filed: Feb. 22, 1983

Related U.S. Application Data

[63] Continuation of Ser. No. 268,812, Jun. 1, 1981, abandoned.

[30] Foreign Application Priority Data

| | | | |
|---|---|---|---|
| Jun. 4, 1980 | [CH] | Switzerland | 4334/80 |
| Jul. 11, 1980 | [CH] | Switzerland | 5351/80 |
| Mar. 6, 1981 | [CH] | Switzerland | 1527/81 |

[51] Int. Cl.$^{3}$ .......................... C09B 67/26; C09B 67/10

[52] U.S. Cl. .......................... 8/527; 8/575; 8/578; 8/582; 8/584; 8/585; 8/549

[58] Field of Search .......................... 8/527

[56] References Cited

FOREIGN PATENT DOCUMENTS 1301723 1/1973 United Kingdom .
1359898 7/1974 United Kingdom .

*Primary Examiner*—Maria Parrish Tungol
*Attorney, Agent, or Firm*—Joseph G. Kolodny

[57] ABSTRACT

A process for the preparation of storage-stable concentrated fluid dye compositions of water-soluble dyes, wherein an aqueous solution or suspension of at least one anionic crude dye is passed over a semi-permeable membrane containing ionic groups and having a pore diameter of 1 to 500 Å, to remove salts and synthesis by-products of molecular weights less than 500 and to partially remove water, optionally dried, and mixed with a water-miscible organic solvent and, if desired, further additives, before and/or after passage over the semi-permeable membrane. The fluid dye compositions obtained are particularly suitable for use in spray solutions for dyeing leather, as well as for the dying and printing of textile materials, in particular cellulosic fibres.

38 Claims, No Drawings

PROCESS FOR THE PREPARATION OF CONCENTRATED FLUID DYE COMPOSITIONS

This is a continuation of application Ser. No. 268,812 filed June 1, 1981 now abandoned.

The present invention concerns a process for the preparation of storage stable, concentrated aqueous-organic or organic dye compositions of water-soluble, anionic dyes, the dye compositions as such, and their use, especially for spray application to leather, as well as for dyeing and printing of textile materials.

In a first embodiment, the invention concerns a process for the preparation of storage stable, concentrated aqueous-organic or organic dye compositions of water-soluble, anionic dyes, which are suitable especially for spray application to leather.

Spray dyeings make it possible very quickly to supply leather in any desired shade from stock, to obtain single-sided dyeings on leather for unlined shoes, and to dye leather which has already been tanned, retanned, fat-liquored and dried, without again wetting back. In particular, however, spray dyeing allows grain leather, which has been pre-dyed in a basic shade by drum dyeing, to be brought to a fashion shade, and also allows shades to be corrected or brightened by spray dyeing on the grain side or the flesh side. To improve the wetting, the depth of penetration and the levelling, the spray liquors often contain substantial amounts of solvents and emulsifiers, dispersants and other assistants. The spray dyeing of leather entails very high requirements in respect of the very fluid preparations used for the purpose. Thus, for example, they must be miscible with water, organic solvents or mixtures of these. Furthermore, on application to leather, the dyes must be in solution or, in the case of sparingly water-soluble dyes, must be in a state of very fine dispersion. The preparations must be compatible with the assistants used in leather spray-dyeing, and must not precipitate out on dilution with water. It is furthermore highly desirable that these fluid preparations should be stable on storage for a lengthy period (at least several months). Undesired crystallisation or sedimentation can lead to blockage and/or erosion of the spray nozzles and can produce bronzed dyeings, which have insufficient rub fastness and show an incorrect shade.

German Offenlegungsschrift No. 2,802,326 describes fluid, inter alia aqueous-organic, dye preparations of metal complex dyes, preferably of those which are sparingly soluble or insoluble in water and are in part suitable for spray dyeing of leather.

However, if in place of the dyes which are sparingly soluble or insoluble in water, very soluble dyes are used, precipitates or crystals frequently form after prolonged storage (several months), and these entail the disadvantages mentioned above.

This effect manifests itself particularly if the preparations contain a relatively large amount of water (about 10 to 50%, based on the preparation) or a relatively large amount of dye.

Further, British Specification No. 1,301,723 describes stable, concentrated solutions, with a low water content, of metal complex azo dyes containing sulfonic acid groups; these solutions contain organic solvents which are at least partially miscible with water. With these solutions again, the shelf life often decreases with increasing water-solubility of the dye, and/or with the presence of increasing amounts of water.

British Specification No. 1,359,898 describes the preparation of purely aqueous dye solutions of, inter alia, anionic water-soluble dyes, using membrane ultrafiltration. These dye solutions, however, are not storage stable and are also not suitable for spray dyeing of leather, because they can produce precipitates with the solvents and/or assistants conventionally present in spray liquors.

In a further embodiment, the invention concerns a process for the preparation of storage-stable, concentrated fluid dye compositions of water-soluble, anionic reactive dyes. Fluid dye compositions have advantages over the powder form; for example, they do not evolve dust when print pastes or padding and dyeing liquors are made up, they do not raise wetting problems due to the formation of lumps, and they do not give spotty dyeings due to undissolved dye particles. Such fluid compositions should be highly concentrated (at least 10% by weight and preferably more than 15% by weight of dye content) and should be stable without change over several months in a wide temperature range (−10° to +40° C.).

In the case of so-called fibre-reactive dyes, however, it is a particular problem to prepare fluid compositions of this type since, on storage, reactive dyes tend to undergo chemical reactions which impair the dyeing properties of the dyes and, in addition, the solubility of many reactive dyes is too low for the preparation of sufficiently concentrated compositions.

It was therefore the object of the present invention to prepare concentrated, fluid compositions of water-soluble non-reactive, anionic dyes, which compositions are stable for several months and are, in particular, suitable for spray application to leather, as well as to prepare concentrated, fluid compositions of water-soluble, anionic reactive dyes.

This object is achieved by preparing organic-based dye compositions by a method wherein an aqueous solution or suspension of at least one anionic crude dye is passed over a semi-permeable membrane containing ionic groups and having a pore diameter of 1 to 500 Å, to remove salts and synthesis by-products of molecular weights less than 500 and to partially remove water, optionally, dried, and mixed with a water-miscible organic solvent and, if desired, further additives, before and/or after passage over the semi-permeable membrane. In this way, a purely organic, or an aqueous/organic, storage-stable dye composition is obtained.

For the water-soluble reactive dyes buffer substances are employed as further additives and N-methylpyrrolidon is preferably used as organic solvent.

In this way, a storage-stable dye composition is obtained which contains less than 1% of inert salts. Inert salts are to be understood as those which originate from the synthesis, due to neutralisation and/or salting-out of the dye, and are carried along in the synthesis solution or suspension, such as sodium or potassium salts, for example sodium or potassium chloride, sodium or potassium sulfate or sodium or potassium bisulfate, especially sodium chloride.

The invention also provides the fluid dye compositions obtained by the process according to the invention and their use for the preparation of padding liquors, dye baths, print pastes or spray solutions which are used for dyeing and printing textile materials, in particular those containing cellulose, as well as paper and especially leather.

The water-soluble anionic dyes are in particular anionic dyes which have a solubility in water at room temperature (20° C.) of 10–60 or more g/l, preferably at least 30 g/l. Preferred dyes are acid dyes, such as metal complex dyes, chroming dyes, developing dyes and mordant dyes as well as reactive dyes. In particular, these dyes contain sulfonic acid groups and/or carboxylic acid groups and are metal-free or metallised or metallisable monoazo, disazo and polyazo dyes, formazane dyes, anthraquinone dyes, nitro dyes, methine dyes, acid triphenylmethane dyes, xanthone dyes, naphthazarine dyes, quinophthalone dyes and phthalocyanine dyes. The reactive dyes are dyes which possess at least one fibre-reactive radical in the dye molecule, these radicals being, in particular, heterocyclic groups or, preferably, an acyl group of a carboxylic acid, the groups possessing at least one halogen atom which can be split off under the dyeing conditions.

Suitable water-soluble metal complex dyes are those containing sulfonic acid groups and/or carboxylic acid groups, for example 1:1- or 1:2-metal complexes of azo or azomethine dyes or metallised phthalocyanines, especially copper and nickel phthalocyanines. The 1:1- and 1:2-metal complexes are preferably 1:1-nickel complexes, 1:1-cobalt complexes, 1:1-copper complexes, 1:1-chromium complexes, 1:1-iron complexes or symmetrical or asymmetrical 1:2-cobalt complexes, 1:2-iron complexes or 1:2-chromium complexes of, in particular, o-carboxy-o'-hydroxy-, o-hydroxy-o'-amino- or o,o'-dihydroxy-azo dyes of the benzene-azo-benzene, naphthalene-azo-naphthalene, benzene-azo-naphthalene, benzene-azo-pyrazolone, benzene-azo-pyridone or benzene-azo-acetoacetic acid amide type, these groupings being unsubstituted or substituted. Examples of suitable substituents are substituted or unsubstituted sulfonic acid amide or sulfone groups, halogen or nitro.

The copper phthalocyanines and nickel phthalocyanines used according to the invention are derived from the conventional mixtures of different degrees of sulfonation and preferably contain 2 to 3 or even 4 sulfated sulfonic acid-$\beta$- or -$\gamma$-hydroxyalkylamide groups but can in addition also contain individual halogens and individual sulfonic acid amide groups, the sulfonic acid amide groups being unsubstituted at the nitrogen or substituted at the nitrogen by, for example, lower alkyl, such as methyl, ethyl, propyl or butyl, or lower hydroxyalkyl, such as 2-hydroxyethyl, 2-hydroxypropyl or 3-hydroxypropyl.

Suitable water-soluble fibre-reactive dyes which can be used according to the invention, preferably contain sulfonic acid groups and, in particular, are metal-free or metallised or metallisable monoazo, disazo and polyazo dyes, pyrazolone dyes, thioxanthone dyes, oxazine dyes, stilbene dyes, formazan dyes, anthraquinone dyes, nitro dyes, methine dyes, styryl dyes, azastyryl dyes, acid triphenylmethane dyes or phthalocyanine dyes, and especially dyes of the azo series, anthraquinone series and phthalocyanine series, which contain at least one fibre-reactive group.

The water-soluble fibre-reactive metal complex dyes can be those which contain sulfonic acid groups or carboxylic acid groups and have at least one fibre-reactive radical in the dye molecule, for example fibre-reactive 1:1 or 1:2 metal complexes of azo dyes or azomethine dyes or metallised phthalocyanines, in particular copper phthalocyanines and nickel phthalocyanines. The fibre-reactive 1:1 and 1:2 metal complexes are preferably 1:1 nickel complexes, 1:1 cobalt complexes, 1:1 copper complexes, 1:1 chromium complexes, 1:1 iron complexes or symmetrical or asymmetrical 1:2 cobalt complexes, 1:2 iron complexes or 1:2 chromium complexes of especially o-carboxy-o'-hydroxy-, o-hydroxy-o'-amino- or o,o'-dihydroxyazo dyes of the type of benzene-azo-benzene, naphthalene-azo-naphthalene, benzene-azo-naphthalene, benzene-azo-pyrazolone, benzene-azo-pyridone or benzene-azo-acetoacetamide; these dyes can be unsubstituted, apart from the fibre-reactive radicals, or they can be substituted by the customary substituents.

Reactive groups are to be understood as those which have one or more substituents which are detachable under dyeing conditions and which, when the dyes are applied to cellulose materials in the presence of acid-binding agents and, if appropriate, under the action of heat, are capable of reacting with the hydroxyl groups of cellulose or, when they are applied to natural or synthetic polyamide fibres, with the NH groups of this fibre, with the formation of chemical bonds. A large number of fibre-reactive groupings of this type are known from the literature.

Examples of such reactive groups are those of the vinylsulfone series and sulfamide derivatives thereof, and in particular heterocyclic radicals, such as those having 2 or 3 nitrogen atoms in the heterocyclic ring, which carry at least one fibre-reactive substituent, such as a halogen atom, on a C atom, such as radicals of the halogenotriazinyl, halogenoquinoxalinyl, halogenopyridazinyl and halogenopyrimidinyl series or the acyl radicals of halogen-containing aliphatic carboxylic acids or unsaturated carboxylic acids, such as the acyl radical of acrylic acid or the radicals of $\beta$-bromopropionic acid and $\alpha,\beta$-dibromopropionic acid.

Examples of fibre-reactive groups of the vinylsulfone series are, in addition to the vinylsulfonyl group itself, aliphatic sulfone groups which, in the $\beta$-position relative to the sulfone group, contain a group which can be eliminated under alkaline conditions, such as a halogen atom or an ester radical of an acid, for example the $\beta$-chloroethylsulfonyl, $\beta$-acetoxyethylsulfonyl, $\beta$-(3-sulfobenzoyloxy)-ethylsulfonyl, $\beta$-sulfatoethylsulfonyl, $\beta$-thiosulfatoethylsulfonyl, $\beta$-phosphatoethylsulfonyl and $\beta$-sulfatoethylsulfonylmethylamino group or the vinylsulfonylmethylamino group.

Preferred reactive groups are especially an acyl group of a carboxylic acid or, preferably, heterocyclic groups, these groups containing at least one halogen atom which is detachable under dyeing conditions.

Examples are the following reactive groups: s-triazinyl radicals which carry one or two halogen atoms, such as chlorine, fluorine or bromine atoms, on the triazine ring, pyrimidyl radicals which carry one to three halogen atoms, such as chlorine and/or fluorine atoms, or one or two arylsulfonyl or alkanesulfonyl groups on the pyrimidine ring, 2,3-dichloroquinoxaline-5- or -6-carbonyl groups or 2-chlorobenzothiazolyl groups.

Especially, however, these are monochloro-, monofluoro- or dichloro- or difluoro-triazinyl groups, di- or tri-chloropyrimidinyl groups and difluorochloropyrimidinyl groups.

Advantageously, the fluid dye compositions according to the invention contain, as the reactive dye, at least one fibre-reactive dye which contains a group conferring solubility in water and carries, as the reactive radical, at least one heterocyclic group containing at least one detachable halogen atom, such as, preferably, the dyes of the formula I $$D—Z_n \qquad (I)$$

in which D is the radical of a metal-free or metallised azo, anthraquinone or phthalocyanine dye which contains one or more groups conferring solubility in water, Z is a diazinyl or triazinyl group which contains at least one detachable halogen atom and, if appropriate, is linked to D via an amino group, and n is 1 or 2.

Preferred dye compositions are those which contain dyes of the formula Ia $$D—Z_n' \qquad (Ia)$$

in which D is as defined under formula I and Z' is a group of the formula

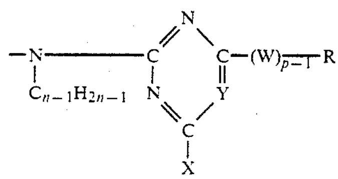

in which W is

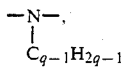

X is halogen, preferably Cl or F, Y is =N—, =CH— or =CX—, n is 1 or 2, preferably 1, p is 1 or 2 and q is a number from 1 to 3, and, if p is 2, R is substituted or unsubstituted lower alkyl, phenyl or naphthyl and, if p is 1, R can be halogen, lower alkoxy or alkoxyalkoxy, lower alkylsulfonyl, substituted or unsubstituted phenoxy, or $—NH_2$.

A further class of preferred reactive dyes which can be used according to the invention are those of the formula II $$D'—Z_n'' \qquad (II)$$

in which D' is the radical of a metal-free or metallised azo, nitro, pyrazolone, thioxanthone, oxazine, anthraquinone, stilbene or phthalocyanine dye which contains one or more groups conferring solubility in water, and Z'' is an acyl radical of a halogen-containing aliphatic carboxylic acid or unsaturated carboxylic acid and n is 1 or 2.

In the present process, the dyes containing sulfonic acid groups, and their metal complexes, are preferably used in the form of their metal salts, as obtained in the synthesis, for example the potassium, magnesium or, in particular, sodium salts. However, the dyes can also be used in the form of their amine salts.

The dyes can, if desired, also be used in mixtures with one another or, if desired, with dyes of a different type.

The dyes which can be employed according to the invention are known and can be prepared by known methods.

The organic solvents usable according to the invention are water-miscible, ie. they form a homogeneous phase with water. They can be used individually or as mixtures. They advantageously have a boiling point of not less than 80° C. Examples of particularly preferred solvents are the polyhydric alcohols which are liquid at room temperature, or their ethers and/or esters, such as ethylene glycol, propylene glycol, diethylene glycol, triethylene glycol, tetraethylene glycol, glycerol, 2-methylpentane-2,4-diol, ethylene glycol monomethyl, monoethyl or monobutyl ether, propylene glycol monomethyl, monoethyl or monobutyl ether, diethylene glycol monomethyl, monoethyl or monobutyl ether, triethylene glycol monobutyl ether, dipropylene glycol, glycerol 1,3-diethyl ether, diethylene glycol monoethyl ether acetate, diethylene glycol monoacetate, thiodiglycol, polyethylene glycol and water-soluble polyethers.

Other preferred solvents are ketones and hydroxyketones, such as methyl ethyl ketone, acetonylacetone and especially diacetone-alcohol, monoalcohols which can contain ether groups, such as isopropyl alcohol, glycerol formal (5-hydroxy-1,3-dioxane, 5-hydroxymethyl-1,3-dioxolan), 2-hydroxymethyltetrahydropyran and especially tetrahydrofurfuryl alcohol, as well as cyclic ethers and esters, such as tetrahydrofuran, dioxane, glycol formal (1,3-dioxolan) and ethylene carbonate (1,3-dioxol-2-one).

Other solvents which can be used include lactams and lactones, such as N-methylpyrrolidone, cyclohexylpyrrolidone, 1,5-dimethylpyrrolidone and especially $\gamma$-butyrolactone, esters of aliphatic hydroxycarboxylic acids, such as ethyl lactate and ethyl hydroxybutyrate, nitriles which can contain hydroxyl groups, such as acetonitrile and $\beta$-hydroxypropionitrile, as well as sulfur-containing compounds, such as derivatives, which can be substituted in the $\alpha$- and/or $\beta$-position by alkyl or hydroxyalkyl groups, of 2,5-dihydrothiophene-1,1-dioxide (sulfolene) or of tetrahydrothiophene-1,1-dioxide (sulfolane), and, in particular, dimethyl sulfoxide. Other suitable solvents are low molecular weight aliphatic carboxylic acids, such as formic acid, acetic acid and lactic acid, amides of low molecular weight aliphatic carboxylic acids, such as formamide and N,N-dimethylformamide, and, preferably, amides of carboxylic acids of at least 2 C atoms, such as N,N-dimethylacetamide and N,N-dimethylmethoxyacetamide, methylated amides of carbonic acid or of phosphoric acid, for example N,N,N',N'-tetramethylurea, methylphosphonic acid bis-N,N-dimethylamide and especially hexamethylphosphorotriamide, and other phosphorus compounds, such as phosphoric acid esters and phosphonic acid esters, especially dimethyl methylphosphonate, and also alkanolamines, for example ethanolamine.

N-Methylpyrrolidone is a particularly suitable organic solvent for the reactive dyes.

As further additives, the concentrated fluid compositions according to the invention can contain surfactants, other organic solvents, for example benzyl alcohol or solubilising agents, such as caprolactam, trimethylolethane, lactamide or tetrahydroxymethylmethane Pentaerythritol), as well as anti-foam assistants, for example silicone oils, materials which inhibit fungal and/or bacterial growth, acids, such as acetic acid, hydrochloric acid, phosphoric acid or formic acid, or bases, such as NaOH, LiOH, ammonium hydroxide or alkylamines, for example alkylamines having 1 to 6 carbon atoms, such as ethylamine or methylamine.

Furthermore, the solutions prepared by the process according to the invention can also be mixed with relatively small amounts (about 1 to 10 g/l) of conventional additives such as urea, dextrin or glucose.

The surfactants (tensides) usable according to the invention can be employed individually or as mixtures. They are in general used in amounts of 1 to 35 percent by weight, based on the dye composition.

In addition to these surfactants, the further additives can be used in total amounts of 1 to 35 percent by weight, based on the dye composition.

Examples of surfactants usable according to the invention are dispersants and wetting agents of anionic, cationic or non-ionic nature, such as sodium dioctylsulfosuccinate, dibutylnaphthalenesulfonate, dodecylbenzenesulfonate, laurylpyridinium chloride, alkylphenyl polyglycol ethers, stearyl-diphenyl-oxyethyldiethylenetriamine and ethylene oxide addition products.

Preferred anionic surfactants (tensides) are condensates or aromatic sulfonic acids with formaldehyde, for example condensates of formaldehyde, naphthalenesulfonic acid, and benzenesulfonic acid, or condensates of crude cresol, formaldehyde and naphthalenesulfonic acid, and, in particular, condensates of phenolsulfonic acid, cresolsulfonic acid or naphtholsulfonic acid and formaldehyde, or ligninsulfonates (sulfite-cellulose waste liquor) or hydroxy lignin-sulfonates and especially condensates of naphthalenesulfonic acid and formaldehyde, and their alkali metal salts and/or ammonium salts.

The surfactant compounds usable according to the invention can in particular also be mixtures of assistants, for example the reaction product of 5 mols of ethylene oxide and 1 mol of 2-ethylhexanol, or the reaction product of 8 mols of ethylene oxide and 1 mol of o-phenylphenol, mixed with the reaction product of coconut fatty acid and 2 mols of diethanolamine, the reaction product of stearic acid and 2 mols of diethanolamine or the ammonium salt of the acid sulfuric acid ester of the addition product of 2 mols of ethylene oxide with 1 mol of p-tert.-nonylphenol.

Such mixtures of assistants are known from German Offenelgungsschrift No. 2,802,326.

The fluid compositions according to the invention advantageously have the following composition: 10 to 60% by weight, especially 15 to 45% by weight, of at least one dye containing a sulfonic acid group or carboxylic acid group and 15 to 85% by weight, preferably 20 to 80% by weight, of at least one water-miscible organic solvent, with or without 5 to 50% by weight, preferably 20 to 30% by weight, of water and/or 1 to 40% by weight, preferably 5 to 35% by weight, of other additives. All the percentages are based on the total weight of the fluid compositions.

Preferred aqueous fluid compositions contain 15 to 40% by weight of dye, 20 to 65% by weight of organic solvent, and 6 to 35% by weight of water, with or without 5 to 35% by weight of other additives.

Preferred organic fluid compositions contain 15 to 45% by weight, especially 20 to 45% by weight, of dye and 50 to 85% by weight of organic solvent, with or without 10 to 40% by weight of other additives.

These organic fluid compositions can additionally contain small amounts of water (residual moisture, up to at most about 5%).

The dye content of the fluid compositions of fibre reactive dyes according to the invention can be, in particular, between 10 and 60 percent by weight, relative to the total composition.

The concentrated fluid compositions of fibre reactive dyes preferably contain N-methylpyrrolidone as organic solvent. Advantageously, they contain 2 to 15% by weight, preferably 4 to 10% by weight, of N-methylpyrrolidone, relative to the fluid composition.

These compositions contain not more than 1% by weight, in particular not more than 0.5% by weight and preferably not more than 0.1% by weight, relative to the fluid composition, of inorganic inert salt.

Buffer substances suitable for the dye formulations according to the invention are all those which are not capable of any chemical reaction with the reactive group, which would reduce the dyeing yield, for example sodium and potassium acetate, sodium and potassium oxalate, the various primary, secondary and tertiary sodium and potassium salts of phosphoric acids or their mixtures, and sodium borate. Amongst these, sodium dihydrogen phosphate and/or disodium hydrogen phosphate are preferred. They are used, in particular, in quantities of 0.2 to 5% by weight, preferably 0.5 to 3% by weight, relative to the dye composition.

The pH value of the compositions is especially 3 to 8, preferably 6.5 to 7.5.

Moreover, minor quantities (about 1 to 10 g/l in each case) of further additives which are inert to the reactive dyes, for example textile assistants, anti-foam agents and substances which inhibit fungal and/or bacterial growth, can also be added to the solutions prepared by the process according to the invention.

In general, the further additives can be employed in total quantities of 1 to 30% by weight, relative to the dye composition.

Accordingly, the preferred fluid dye compositions according to the invention contain 10 to 60% by weight, preferably 15 to 45% by weight, of at least one fibre-reactive dye which contains a group conferring solubility in water and carries, as the reactive radical, at least one heterocyclic group or an acyl grop of a carboxylic acid, these groups containing at least one detachable halogen atom, 2 to 15% by weight of N-methylpyrrolidone, 0.2 to 5% by weight of at least one buffer substance, at most 1% by weight of inorganic inert salt and, if appropriate, 1 to 30% by weight of further additives, and have a pH value from 3 to 8.

The percentages relate in each case to the total weight of the fluid composition.

The process according to the invention is carried out, for example, as follows:

An aqueous solution or suspension of the water-soluble crude dye is first passed over a semi-permeable membrane and is then dried, for example in a spray drier or some other drying apparatus such as a Venuleth apparatus, or the like. The dry dye is then mixed, in optional sequence, with a water-miscible, organic solvent or mixture of such solvents, and, where appropriate, with water and/or conventional formulating assistants and further additives. The preferred procedure is to stir the mixture at room temperature (15° to 30° C.) or to heat it, with stirring, at temperatures of up to 130° C., preferably 40° to 80° C., depending on the nature of the solvent used, and then to allow it to cool to room temperature.

In a further embodiment, the aqueous solution or suspension of the water-soluble crude dye, after having been passed over the semi-permeable membrane, is immediately mixed, without intermediate drying, with the organic solvent and further additives, if any. The aqueous starting solution or suspension can, where appropriate, also contain organic solvent and/or other additives desirable for the preparation of the fluid compositions.

The aqueous starting solution or suspension used can be the solution or suspension obtained directly from the synthesis, or an aqueous slurry of the moist press cake or filter cake of the crude dye, containing various amounts of undesired dissolved substances of low molecular weight, especially of by-products arising in the synthesis of the dye and dissolved inorganic and organic salts. In cases where, for example, the coupling product or condensates can only be separated out with extreme difficulty, if at all, it is also possible to use the crude coupling solution, condensation solution or neutralisation solution direct. Advantageously, starting solutions or suspensions which contain 2 to 50% of dye are used.

In the case of some dyes, especially metal complex dyes, it is advantageous to subject the crude dye, obtained from the synthesis solution or as a press cake, to wet grinding by conventional methods, for example in a sand mill or microsol mill.

However, it is also possible to use the crude dye powder as the starting material, if it is first made into a slurry with water.

If desired, the synthesis mixture can be diluted with water or organic solvents and/or mixed with further additives which are desirable for the preparation of the fluid compositions, for example with surfactants. In this way, the additives, especially the surfactants, are also desalted and concentrated, in one process step. Of course, only such additives as are also retained by the membrane and furthermore do not adversely affect the membrane are added. To separate off synthesis by-products having molecular weights which are below the cutoff level of the membrane used, the mixture is passed over a semi-permeable membrane. At the same time it is concentrated to a dye content of at least 10% and advantageously 20% to 60%.

The process according to the invention not only makes it possible to produce fluid dye compositions having improved properties, but also offers technical advantages over the conventional processes since certain process steps, for example lengthy filtration stages or centrifuging, can be eliminated or speeded up, thereby, inter alia, saving time and energy.

Semi-permeable membranes which can be used according to the invention are intended to retain relatively high-molecular substances, whilst ensuring a high rate of transition of water and dissolved substances of low molecular weight, for example salts, such as sodium chloride, sodium sulfate, potassium chloride, ammonium sulfate, sodium phosphate, potassium sulfate or sodium acetate, or low-molecular impurities, for example unconverted or partially decomposed starting materials.

However, they should also be able to separate molecules carrying different charges.

The retention or separation (cut-off level) depends on the molecular weight and/or the ionic charge.

This membrane hyperfiltration is also referred to as reverse osmosis and is related to ultrafiltration. The former term means separation processes at the molecular level.

Suitable membranes which can be used according to the invention are advantageously semi-permeable, charged, preferably asymmetrical membranes, whose pores have a diameter of 1 to 500 Å. They advantageously consist of organic material which contains ionic groups. These membranes have a cut-off level of 300 to 500. For the process according to the invention, membranes having a cut-off level of 400 to 500 are particularly suitable. They permit the passage, at high speeds per unit area, and under low to medium pressure, of water which may or may not be mixed with organic solvents and dissolved substances which because of their molecular sizes are below the cut-off level. According to the invention, pressures of 10 to 100 bar, preferably of 10 to 30 bar, and in particular 20 to 30 bar, are used. The pressure can be exerted by means of, for example, a pump.

In a single filtration pass, the desalting effect can be 70 per cent or more, without loss of dye. In such a pass, the volume of the solution of the retained substances (on the concentrate side) decreases correspondingly and the concentration of the retained portion increases. If a further reduction in the content of low-molecular components is desired, this can readily be achieved, after diluting the retained solution or suspension with water, advantageously to the initial volume, by repeating the above process once or several times. The separation can also be carried out continuously, by matching the rate of feed of water to that of the decrease in permeate. Whether the process is carried out discontinuously or continuously, it is in this way possible to achieve, by this simple method, at room temperature, desalting effects and purification effects of up to 95% or, if desired, even up to 99% or more, ie. until the permeate is free from undesired substances.

The preferred membranes which can be used according to the invention essentially consist of a polymeric material which is modified, at least at the surface, by radicals having ionisable groups.

Natural, semi-synthetic or synthetic materials modified in this way can be converted to membranes. A polymeric substance to be modified in this way contains, for example, hydroxyl and/or amino groups as reactive groups. It can then be reacted with suitable reagents which, on the one hand, contain ionisable groups and, on the other hand, contain at least one group which is capable of reacting to form a covalent bond.

For example, the following polymeric compounds can be modified in the manner indicated: polymer electrolytes, polyvinyl alcohols, cellulose ethers or esters, such as cellulose nitrate or propionate or, preferably, cellulose acetates, for example those having a low content of acetyl groups, but also more highly acylated cellulose, for example so-called $2\frac{1}{2}$-acetate, or polyacrylonitrile and copolymers of acrylonitrile and other ethylenically unsaturated monomers.

Suitable reactive reagents which contain an ionisable group are colourless and coloured compounds, for example ionic reactive dyes which can belong to various classes, such as anthraquinone, azo or formazan dyes. The following are reactive groups which can bond these reagents to the starting polymers: carboxylic acid halide groups, sulfonic acid halide groups, radicals of $\alpha,\beta$-unsaturated carboxylic acids, for example of acrylic acid, methacrylic acid, $\alpha$-chloroacrylic acid or $\alpha$-bromoacrylic acid, radicals of preferably lower halogenoalkylcarboxylic acids, for example of chloroacetic acid, $\alpha,\beta$-dichloropropionic acid or $\alpha,\beta$-dibromopropionic acid, radicals of fluorocyclobutanecarboxylic acids, for example of tri- or tetra-fluorocyclobutanecarboxylic acid, radicals with vinylacyl groups, for example vinylsulfone groups or carboxyvinyl groups, and halogenated pyrimidine radicals or halogenated 1,3,5-triazine radicals.

Examples of suitable ionisable groups are sulfato groups, sulfonic acid groups, sulfonamide groups, carboxylic acid groups, carboxamide groups, hydroxyl groups, thiol groups, isocyanate groups and/or thioisocyanate groups, ammonium groups formed from primary, secondary or tertiary amino groups and hydrogen, or quaternary ammonium groups, and also phosphonium or sulfonium groups. Particularly advantageous results are in some cases achieved with compounds containing sulfonic acid groups. Polymer membranes which are modified by an azo dye containing sulfonic acid groups are particularly valuable and versatile in use. The azo dye can also contain complexed metal, for example copper.

Membranes of (partially acetylated) cellulose acetate can be modified, for example, by reaction with the abovementioned reactive chemical compounds, especially reactive dyes (British Specification No. 1,504,261).

Cellulose acetate can be further modified, for example, by means of the following chemical reactions (in the order indicated): with a polyfunctional monomeric compound having at least two functional groups (for example cyanuric chloride), with a polyfunctional polymer (for example polyethyleneimine) and with an ionic compound (for example ionic reactive dyes, reactive groups and ionic groups, as indicated) (European Application No. 26 399).

Membranes containing polyvinyl alcohol can also be modified analogously.

The polyfunctional monomeric compound preferably has at least 2 functional groups. Halogenodiazines or halogenotriazines, for example cyanuric halides (cyanuric chloride), or tri- or tetra-halogenopyrimidines (tetrachloropyrimidine) are particularly suitable.

The polyfunctional polymers have, in particular, aliphatic or aromatic amino groups, hydroxyl groups, thiol groups, isocyanate groups and/or thioisocyanate groups. Suitable polyfunctional polymers are polyethyleneimine, polyvinyl alcohol, cellulose derivatives or polyvinylaniline; polyethyleneimine is preferred.

As ionic groups, the membrane preferably contains sulfonic acid groups, carboxylic acid groups or ammonium groups.

The membranes which contain radicals of a reactive dye as radicals having ionic groups are particularly advantageous.

It is also possible, however, to use membranes which consist of a base structure containing polyacrylonitrile or a copolymer of acrylonitrile and other ethylenically unsaturated monomers (British Specification No. 2,058,798).

By reaction with hydroxylamine, amidoxime groups are introduced into the membrane and these are then modified as indicated for the cellulose acetate membranes.

The proportion of acrylonitrile units in the base structure of the membrane is advantageously at least 5 and preferably at least 20 per cent by weight.

Copolymers of acrylonitrile and vinyl acetate, vinyl ethers, vinylpyridine, vinyl chloride, styrene, butadiene, (meth)acrylic acid, maleic anhydride, 2-aminomethylmethacrylate or allyl compounds, or terpolymers or tetrapolymers based on acrylonitrile, are preferred.

The membranes modified in this way can also be subjected to a heat treatment. The heat treatment substantially determines the pore size of the membrane skin. For example, the membrane is treated for 1 to 30 minutes at a temperature of 60° to 90° C., advantageously by dipping it into warm water. Where appropriate, the heat treatment can also be carried out before the reaction with the reactive compound containing ionisable groups. Furthermore, the reaction can also be carried out before the polymeric material is converted to an assymmetric membrane.

The membranes can have various forms, for example a plate, sheet, tube, pocket, cone or hollow fibres. If they are to be subjected to high pressure, the membranes can of course be supported by wire mesh or perforated plates. Within the range mentioned above, the pore size can be varied by graduated heat treatment, and can also be matched to the particular end use. Advantageously, the average charge density (i.e. content of ionisable groups) in the membrane is 1 to 100 milliequivalents per kg of dry membrane.

The concentrated fluid compositions according to the invention are as a rule true solutions or colloidal solutions. They are mobile (viscosity about 5 to 400 cP/20° C.) and have a good shelf life, i.e they remain in a usable state for at least several months at temperatures of −20° to +60° C., especially −10° to +40° C. These compositions can be diluted with water or with organic solvents and/or thickening agents, when preparing padding liquors, dye baths, print pastes and spraying solutions, without causing the dye to precipitate or causing other inhomogeneities. The said padding liquors, dye baths, print pastes and spraying solutions can be used, for example, to dye or print textile material, consisting of natural or synthetic fibres, in particular cellulose-containing fibres, or leather, in a conventional manner. The compositions according to the invention can however also be used for other purposes, for example for colouring paper and for producing inks or printing inks for recording instruments, rubber-stamp pads, typewriter ribbons and the like. The stable concentrated fluid dye compositions according to the invention are particularly suitable for the preparation of padding liquirs and print pastes for the dyeing and printing of cellulosic fibres as well as for the preparation of spraying solutions for use in the spray dyeing of leather, since they can be mixed both with water (for example 1 part of concentrated dye formulation in 4 to 9 parts of water) or with organic solvents, for example etherified glycols or nitro lacquers (for example consisting of 15% of nitrocellulose, 10% of synthetic resin, 5% of plasticiser, 20% of low-boiling solvent (methanol, acetone), 45% of medium-boiling solvent (benzene) and 5% of high-boiling solvent (glycols) (Römpp's Chemie Lexikon, 7th edition, 1974)), without causing a change in the state of distribution of the dye. As stated earlier, these spray solutions remain stable for several weeks, but in particular for a period of about 3 to 14 days, and accordingly, for example, show no precipitation, crystallisation or agglomeration of the dye. Furthermore, during this time the solutions also do not form a multi-phase system. The homogeneity of such mixtures remains fully preserved over the entire period of time. Precipitation of the dye in the mixture would have very troublesome effects during application (for example by spraying), such as blockage of the spray nozzles, or would manifest itself in bronzing of the dye on the surface of the leather.

The process according to the invention offers, inter alia, the following advantages compared to the hitherto customary processes for the preparation of fluid dye compositions: higher dye concentration of the compositions obtained, improved shelf life, increased stability on application, technically simpler use of the fluid form sold commercially, increased yield (increased colour strength) and lower cost of preparation.

In the examples which follow, which illustrate the invention, parts, unless stated otherwise, are parts by weight, and percentages are percentages by weight. Parts by weight bear the same relation to parts by volume as that of the g to the ml. The temperatures are given in degrees centrigrade. The dyes are preferably in the form of an alkali metal salt, especially the sodium salt.

EXAMPLE A

Preparation of the membranes

The preferred membranes which can be used according to the invention can, for example, be prepared as follows:

A solution is prepared from 25 g of cellulose acetate (EASTMAN KODAK, type 398/10, degree of acetylation 39.8%), 45 g of acetone and 30 g of formamide. This is left to stand for three days, poured onto a glass plate and spread with a spatula to give an 0.6 mm thick layer; the solvent is allowed to evaporate for 5 seconds at 25° C., the glass plate is placed in ice water for 2 hours, and the membrane formed is then peeled off the glass plate.

The membrane is then dipped in a 5% aqueous solution of the 1:2 chromium complex compound of the dye of the formula

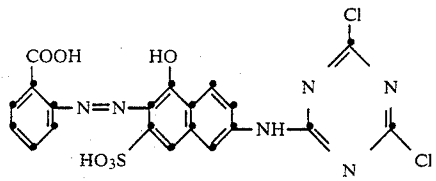

and left therein for 48 hours at a pH value of 6 and at 25° C. The pH value of the dye solution is then brought to 10.4 by adding sodium hydroxide and the solution is agitated constantly for 40 minutes at 25° C.

Instead of treating the membrane in this way with the dye solution in two steps, a single step treatment for 2½ hours at a pH value of 10.5 and at 25° C., with a 10% solution of the chromium complex dye, can be employed. For the subsequent heat treatment, the membrane is introduced into water at 60° C. for 10 minutes.

EXAMPLE 1

(a) The dry crude dye of the formula

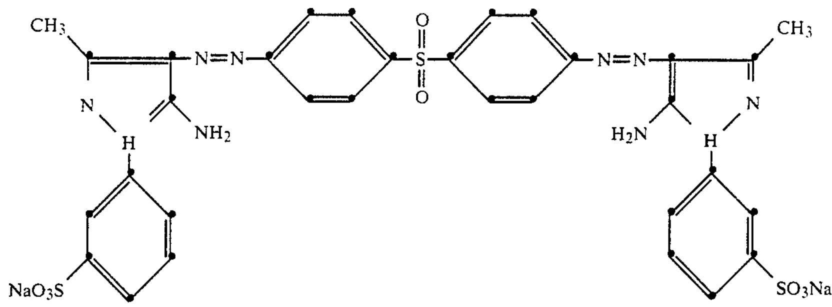

containing about 19.7% of NaCl, based on crude dye, is dissolved in sufficient water to give a solids content of the solution of about 10% and is desalted, and concentrated for 10 hours in a reverse osmosis unit having a membrane area of 0.4 $m^2$ (cellulose acetate membrane [degree of acetylation 40%], modified with an acid halotriazine-containing reactive dye in accordance with British Specification No. 1,504,261), using 10–30 bar gauge pressure. The resulting viscous suspension having a solids content of about 24% is dried in a Venuleth drier at 90°–100°. The resulting dry dye is virtually salt-free.

Instead of using the dry crude dye, the filter press cake of the dye can be used as the starting material. Again, a virtually salt-free dry is obtained.

Instead of using the membrane given above, a membrane according to British Specification No. 2,058,798 or European Application No. 26 399 is used, similar good results are obtained.

(b) 22.0 parts of the dye thus obtained (containing less than 0.1% NaCl) are introduced in the course of 5 minutes, at 50°–60°, into a stirred solvent mixture consisting of 23.4 parts by water, 15.6 parts of γ-butyrolactone and 23.4 parts of ethylene glycol and containing 7.8 parts of the addition product of 8 mols of ethylene oxide with 2-hydroxydiphenyl and 7.8 parts of the condensate of coconut fatty acid with 2 mols of diethanolamine (containing about 2% of emulsified silicone oil as anti-foam agent and about 2.2% of acetic acid).

The mixture is then stirred for 2 hours at 50°–60°. After switching off the heating, the mixture is stirred for a further 3 hours. The resulting solution does not contain any undissolved constituents. 98.5 parts of a very mobile (about 18 cP at 20°), clear dye solution is obtained, which proves very stable in a storage test (involving storage for 9 months at temperatures of −10° to +40°).

The dye solution thus obtained is also very stable for several days when mixed with water, organic solvents or water/solvent mixtures, as used in spray solutions for application to leather; the dye does not precipitate. The following mixtures were tested:

(α) 1 part of dye solution and 4 to 9 parts of water, (β) 1 part of dye solution, 2 parts of ethylene glycol monoethyl ether and 2 parts of water, (γ) 1 part of dye solution, 1 part of ethylene glycol monoethyl ether and 8 parts of water, (δ) 5 parts of dye solution and 95 parts of nitro lacquer, ($\epsilon$) 5 parts of dye solution, 20 parts of water and 75 parts of nitro emulsion.

In none of these mixtures did the dye precipitate. The mixtures can be used, for example, for dyeing leather.

(c) Comparative Example 22.0 parts of the dry dye (containing about 19.7% of NaCl) mentioned under (a) are introduced, without purification by reverse osmosis, into a solvent mixture of the same composition as under (b), and then further processed.

To remove undissolved impurities present, the mixture is sieved through a DIN 130 (=about 40 μm mesh width) steel sieve. It can also be centrifuged.

97.5 parts (=97.5% of the initial amount) of a mobile, homogeneous solution is obtained, having a colour strength about 20% lower than that of the solution obtained under (b).

In a storage test, this solution proved to be less stable than the solution obtained under (b). After seeding with dye crystals and storage for about 10 mohths, an island of crystals, of about 8 mm diameter, had formed. (The original diameter of the island of seeding crystals was 3 mm).

EXAMPLE 2

(a) 15.0 parts of the virtually salt-free dye, purified by reverse osmosis, obtained according to Example 1(a), are introduced, as described in Example 1(b), into the following solvent mixture, and then processed further: 4.25 parts of an addition product of 8 mols of ethylene oxide with 2-hydroxydiphenyl, 4.25 parts of a condensate of coconut fatty acid with 2 mols of diethanolamine (containing about 2% of emulsified silicone oil and 2.2% of acetic acid), 25.5 parts of butyrolactone, 25.5 parts of diethylene glycol and 25.5 parts of water.

The resulting solution does not contain any undissolved constituents and proves very stable in a storage test of 1 years's duration. Even after seeding the solution 4 times with dye crystals, no crystallisation was observed. The seeding crystals in each case disappeared after a short time.

(b) Comparative Example 18.0 parts of the salt-containing dye used according to Example 1(c) are introduced, as described in Example 1(c), into the following solvent mixture, and then processed further: 4.1 parts of an addition product of 8 mols of ethylene oxide with 2-hydroxydiphenyl, 4.1 parts of a condensate of coconut fatty acid with 2 mols of diethanolamine (containing about 2% of emulsified silicone oil and 2.2% of acetic acid), 24.6 parts of butyrolactone, 24.6 parts of diethylene glycol and 24.6 parts of water.

The solution formed has the same colour strength as the solution obtained under Example 2(a). However, in a storage test, the solution was less stable than the solution obtained by using the dye purified by reverse osmosis. During the test period (1 year) the solution was seeded once with dye crystals. The seeding crystals remained undissolved and even a slight crystal growth was observed.

EXAMPLE 3

(a) 20 parts of the desalted dye obtained in Example 1(a) are introduced at 50° to 60° C. in the course of 5 minutes, with stirring, into the following auxiliary/solvent mixture:

4 parts of the reaction product of 8 mols of ethylene oxide and 1 mol of o-phenylphenol,
4 parts of the reaction product of coconut oil fatty acid and 2 mols of diethanolamine (containing about 2% of emulsified silicone oil as anti-foam agent and about 2.2% of acetic acid),
24 parts of diethylene glycol,
24 parts of butyrolactone, and
24 parts of water.

After two hours' stirring at 50° to 60° C., stirring is continued for a further 3 hours at room temperature. The solution formed contains no undissolved constituents.

The dye solution is still stable after 9 months of storage at room temperature. Even the addition of seed crystals of the dye causes no precipitation in the dye solution.

(b) When the diethylene glycol is replaced by the same amount of ethylene glycol, there is likewise obtained a dye solution having very good storage stability.

EXAMPLE 4

860 parts of the dye obtained in Example 1(a) (salt content less than 0.1%) are introduced at 50° to 60° C., within 15 minutes, into a mixture of 244 parts of the reaction product of 8 mols of ethylene oxide and 1 mol of o-phenylphenol, 244 parts of the reaction product of coconut oil fatty acid and 2 mols of diethanolamine, 1462 parts of butyrolactone, 1462 parts of diethylene glycol and 1462 parts of water; the mixture is stirred for 2 hours at this temperature, and subsequently for a further 6 hours at room temperature. A small amount of insoluble impurities is afterwards removed. There are obtained 5633 parts of a very storage-stable, clear and homogeneous dye solution having a density of 1.14 g/cm$^3$ (20° C.) and a viscosity of 20 cP/20° C.

EXAMPLE 5

(a) 95 parts of a paste containing 14.6 parts of the 1:1 chromium complex of the dye of the formula

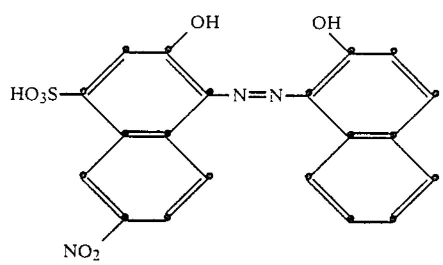

are introduced into 20 parts of water. 47 parts of a paste containing 7.3 parts of the 1:2 chromium complex of the same dye, are then introduced and the mixture is stirred for 2 hours at room temperature.

0.5 part of oxalic acid is then added and the reaction mixture is heated to 95°. It is then neutralised in the course of 15 minutes with about 7 parts by volume of an aqueous 10N sodium hydroxide solution. Thereafter, it is stirred for half an hour at a constant pH value of 6.8–7.2.

Subsequently, 2.25 parts of oxalic acid are added. The resulting solution (pH 3.8–4.0) is brought to pH 4.5–5.0 with about 0.3 part by volume of an aqueous 10N sodium hydroxide solution, and boiled for one hour. The mixture is left to cool to room temperature and 3.75 parts of an addition product of octadecyl alcohol with 35 mols of ethylene oxide are added, with stirring.

(b) The synthesis mixture obtained under (a) and containing about 14.5%–17.5% solids in desalted, and concentrated by reverse osmosis, as in Example 1(a). The resulting viscous suspension, containing more than 25% solids, is dried in a vacuum cabinet.

(c) 52.6 parts of the dye obtained under (b) (containing less than 2% of NaCl) are introduced, with stirring, into a solvent mixture, consisting of 59 parts of ethylene glycol monoethyl ether and 88.4 parts of diethylene glycol, at 50°–60°. The mixture is stirred for 2 hours at this temperature. After switching off the heating, the mixture is then stirred for a further 3 hours. The resulting solution contains virtually no undissolved constituents. The very mobile clear dye solution obtained proves stable in a storage test.

EXAMPLE 6

(a) The dry crude dye of the formula

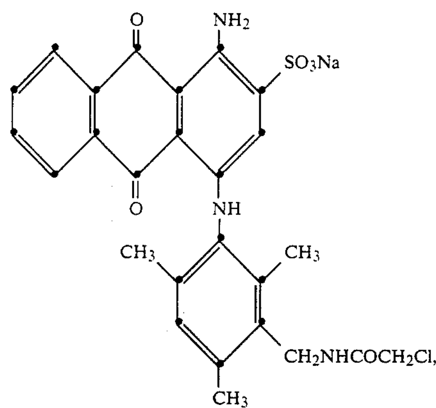

containing about 27.7% of sodium sulfate and about 0.7% of sodium chloride, is dissolved in sufficient water to obtain a solid content in the solution of about 7%. This solution is subjected to reverse osmosis as described in Example 1(a). The resulting concentrate contains about 21% of dry substance. It is dried by means of spray drying (air-inlet temperature 160° C., air-outlet temperature about 80°–85° C.). The dye desalted in this manner no longer contains any sulfate and only a trace of sodium chloride (0.2%); the colour strength of the dye has increased by around 37%, and the shade has not changed as a result of the reverse osmosis treatment. Virtually salt-free dye is likewise obtained when moist press cake is used instead of the dry crude dye as the starting material.

(b) Also the "synthesis solution" of the dye (that is, the slurry obtained directly from synthesis, without the addition of salts, etc., for the purpose of precipitating the dye from the solution) having a solid content of about 21% (suspension, dye partially precipitated) can be desalted by reverse osmosis by diluting the "synthesis solution" to give a solid content of about 10–11%. As a result of this procedure, the properties of the dye change as follows:

| | dye before reverse osmosis | dye after reverse osmosis |
|---|---|---|
| sodium chloride | 0.3% | 0.3% |
| sodium sulfate | 68.6% | 6.4% |
| by-products (M.W. <500) | — | (ca. 3% removed) |
| colour strength (spectrophotometric) | 97% | 321% (corresponding to an increase of 230%) |
| shade | | unchanged |

(c) 88 parts of the dye fully desalted according to Example 6(a) and then dried are introduced at 50°–60° C. in the course of 20 minutes, with stirring, into a solvent mixture consisting of 22.4 parts of ethylene glycol-mono-ethyl ether, 22.4 parts of tetramethylurea and 67.2 parts of diethylene glycol. The mixture is held, with continuous stirring, for 4½ hours at 50°–60° C., and then, after removal of the heating (lowering of the heating bath), stirred for a further 2 hours. In order to separate any insoluble constituents present, the viscous mixture is passed by suction through a sieve having a mesh size of about 40 μm (=DIN 130), no residue at all however being removed in the process. The result is 188.9 parts of dye solution, corresponding to 94.45% of the starting amount.

There is no sign of any change whatsoever in the structure of the solution, that is to say, no crystal growth, after 2 months of storage at room temperature.

(d) When 88 parts of the same dye are introduced, in a manner analogous to that described in Example 6(c), into a solvent mixture consisting of 44.8 parts of tetramethylurea and 67.2 parts of diethylene glycol, there are obtained 187.6 parts of a solution having similar properties, which corresponds to a yield of 93.8% of the starting amount.

After 8 months of storage at room temperature, there is no visible evidence of crystal growth in the solution: As at the commencement of storage, the solution is fully satisfactory.

(e) Comparative Example 80 parts of the dry, non-desalted, crude dye of the formula given in Example 6(a), which contains 27.7% of sodium sulfate and about 0.7% of sodium chloride, are introduced at 50°–60° C., with stirring, into a solvent mixture consisting of 24 parts of ethylene glycol-mono-ethyl ether, 24 parts of tetramethylurea and 72 parts of diethylene glycol; the mixture is subsequently held for two hours at this temperature, after which time the heating is removed and stirring continues for a further 4 hours. 30.5 parts (=15.25%) of insoluble substances (mainly salts) saturated with solution were removed by centrifuging. There are obtained 164.3 parts (=82.15% of the starting amount) of a considerably mobile solution, which, after 6 months' storage at room temperature, already shows signs of the start of crystal growth: countless needles about 16–30 μm in length are visible under the microscope. A soft sticky sediment, which is difficult to stir up, has collected on the bottom of the vessel. The needles consist of dye. After 4 months of storage there was only a trace of sediment in the solution (consisting practically completely of salt particles).

Although the amount of dye in the solution in this case is 34% less than that in Examples 6(c) and 6(d), the dye precipitates after some time in the form of needles from the solution, whereas the salt-free formulations remain stable.

EXAMPLE 7

(a) The "synthesis solution" of the dye of the formula given in Example 1 (which solution is free from additions of salt required to precipitate the dye), which contains 10.7% of solid substances (dye, salts, by-products), is subjected, in the manner described in Example 1(a), to reverse osmosis. The solution thus obtained contains 16.8% of solids. This desalted synthesis solution is spray dried to yield a dye powder having a dry content of 94.9%.

(b) By way of comparison, moist crude-dye press cake from the same synthesis batch (that is, dye precipitated from the synthesis solution) is suspended in water (to give a solid content of 9–10%), and the suspension is subjected to reverse osmosis; the final solid content being 16.7%. The desalted solution is likewise spray dried. The result is a dry dye having a solid content of 94.7%.

(c) For an analytical determination of the salt content, a sample is taken of the moist press cake and of the "synthesis solution":

moist press cake: drying in a vacuum chamber at 80° C. yields dry dye having a solid content of 99.7%;

synthesis solution: heating at 40°–50° C., and filtration through a sieve of 70–75 μm mesh size for removal of the coarser impurities, followed by spray drying (at 160° C. air-inlet temperature and 80°–85° C. air-outlet temperature) to yield from the synthesis solution a dry dye having a dry content of 95.5%.

In Table 1 are shown the properties of the dyes from the synthesis solution and the moist press cake, respectively, both before and after desalting by reverse osmosis (RO).

TABLE 1

| | (1) dye press-cake before RO | (2) dye press-cake after RO desalting | (3) dye synthesis solution before RO | (4) dye synthesis solution after RO desalting |
|---|---|---|---|---|
| sodium chloride | 13.1% | <0.1% | 23.2% | <0.1% |
| sodium acetate | <0.2% | <0.2% | about 2% | <0.2% |
| colour strength (spectrophotometric) | 581% | 639% (i.e. increase of 10%) | 473% | 646% (i.e. increase of 36.6%) |
| colour strength (colourmetric) | 580% | 640% (i.e. increase of 10.3%) | 485% | 645% (i.e. increase of 33%) |
| shade | good | good | good | good |

Solutions having the same composition are produced with the above 4 crude dyes originating from the one synthesis batch, namely crude dye of moist press cake, dry (99.7% dry content), containing salt = solution test 1, crude dye of moist press cake, desalted by RO, then dried (dry content 94.7%) = solution test 2, crude dye direct from the synthesis solution, dry, containing salt (dry content 95.5%) = solution test 3, crude dye from the synthesis solution, desalted by RO, then dried (dry content 94.9%) = solution test 4, the procedure being as follows:

introduction of 37.5 parts of dye (dry content of the powder not taken into account) at 50°–60° C., within 15 minutes, into a mixture consisting of:

10.6 parts of the addition product of 8 mols of ethylene oxide with 2-hydroxy-diphenyl, 10.6 parts of the condensation product of coconut oil fatty acid with 2 mols of diethanolamine (containing about 2% of emulsified silicone oil as anti-foam agent and about 2.2% of acetic acid), 63.8 parts of γ-butyrolactone, 63.8 parts of diethylene glycol, and 63.8 parts of water.

After the additions have been made, the temperature is held, with continuous stirring, for 2 hours at 50°–60° C.; the heating bath is then removed, and the mixture is left to stand, without stirring, for about 12 hours, and subsequently stirred for a further 3 hours at room temperature.

The solutions are then filtered by suction through paper double filters (Macherey-Nagel 713, φ 70 mm).

TABLE 2

| | | Data of the solutions | | | | | |
|---|---|---|---|---|---|---|---|
| Test No. | Yield % of starting amount | Residue on paper filter, % of dye used | Filtering time (Min.) | Colour strength compared with standard | Shade | Spray dyeing | Colour on leather |
| (1) | 97.8% | 0.16%, grey-brown flakes | 2.5 | 93% | good | good | trace paler |
| (2) | 96.3% | 1.18%, white-grey powder | 10.9 | 100% | good | good | trace paler |
| (3) | 97.1% | 0.27%, grey flakes | 6.3 | 75% | trace duller | good | clearly paler, trace duller |
| (4) | 96.0% | 1.9%, white-grey substance | 13.3 | 100% | good | good | good |

*after correction of the dry content of the crude dye = 89.1%

EXAMPLE 8

(Application Example)

100 parts of the dye solution obtained in Example 2(a) are mixed with 100 parts of ethylene glycol-mono-ethyl ether and 800 parts of water to form a spray solution. This solution is applied in an amount of 20 to 100 g per square meter, by means of a spray gun or a spray machine (for example provided with a circular runner on which are mounted 4 to 8 guns), to undyed leather. There is thus obtained a very level, greenish-yellow dyeing on the leather (in pale or deep shades depending on the amount applied), which has very good fastness properties, for example fastness to migration, water drops and to solvents (acetone and alcohol). The spray solution can be applied to pre-dyed leather instead of to undyed leather, and a very level cross-dyeing is obtained.

EXAMPLE 9

9.6 kg of press cake of the crude dye of the formula

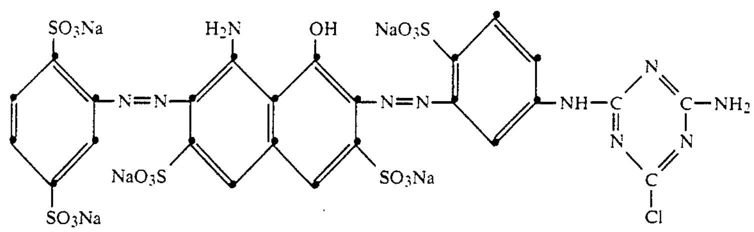

are slurried in 25 kg of water. The suspension obtained, containing 10.9% of dry matter (NaCl content 2.24%) is desalted, and concentrated, in a reverse osmosis unit (0.85 $m^2$ of membrane area), the membrane having been prepared as described in Example A and having a cut-off level of 500. The reverse osmosis is carried out in two stages at pH 7.2 and 20° C. and under a pressure of 25 bar:

(a) Desalting

After adding 30 l of water and then removing 30 l of permeate (mean flow rate about 13 l/hour), a dye suspension containing 0.73% of salt is obtained.

(b) Concentrating:

After desalting, a further 21.9 l of permeate are removed. This gives 12.7 kg of a concentrated dye suspension containing 20.8% of dry matter (0.06% of sodium chloride content).

1.6 parts of $Na_2HPO_4$ and 0.8 part of $KH_2PO_4$ are added in the course of 10 minutes, at 40° C. with stirring, to 76 parts of the dye suspension obtained under (b), and the mixture is diluted with 5 parts of N-methylpyrrolidone and 16.6 parts of water.

This gives a fluid preparation having a pH value of 6.9 and the following composition: 15.8% by weight of dye, 5% by weight of N-methylpyrrolidone, 1.6% by weight of $Na_2HPO_4$, 0.8% by weight of $KH_2PO_4$, about 76.8% by weight of water and <0.05% by weight of NaCl.

The true solution formed is mobile (it has a viscosity of about 8 cP at 20° C., measured with a No. 2 Brookfield spindle) and is stable without change for several months at −10° C. to +40° C. (chemical and physical storage stability).

EXAMPLE 10

(a) 10.5 kg of press cake of the crude dye of the formula

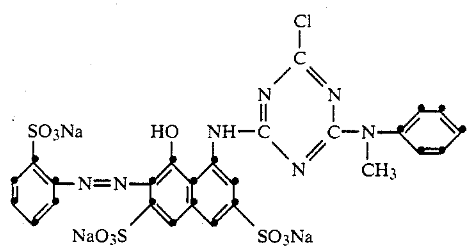

are slurried in 35 kg of water. The suspension obtained, containing 11.8% of dry matter (salt content 0.9%) is desalted and concentrated in one stage in a reverse osmosis unit, 29 l of permeate being removed. This gives 16.6 kg of a concentrated dye suspension containing 29.8% of dry matter (0.14% of sodium chloride).

(b) 1.6 parts of $Na_2HPO_4$, 0.8 part of $KH_2PO_4$, 10.0 parts of N-methylpyrrolidone and 26.4 parts of water are added in the course of 10 minutes at 40° C. with stirring to 61.2 parts of the dye solution obtained under (a). This gives a mobile fluid formulation which is stable without change for several months at −10° C. to +40° C. and has the following composition: 18.2% by weight of dye, 1.6% by weight of $Na_2HPO_4$, 0.8% by weight of $KH_2PO_4$, 10.0% by weight of N-methylpyrrolidone, 69.4% by weight of water and <0.08% by weight of NaCl.

EXAMPLE 11

(a) 60 g of a synthesis solution of the crude dye of the formula

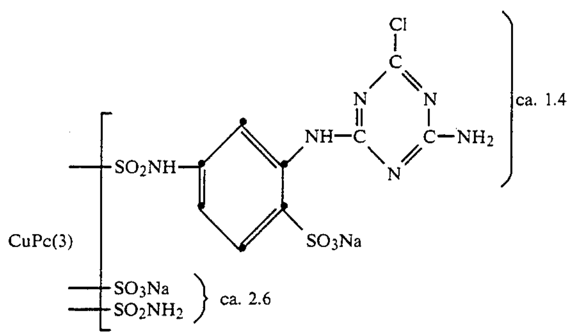

having a dry content of 16.4% (about 12.4% of dye and 4% of NaCl) are desalted and rendered more concentrated in an apparatus for reverse osmosis in the manner described in Example 9. 60 l of water are added during desalting and 60 l of permeate are removed. The dye solution obtained (salt content about 0.7%) is made more concentrated by removing 35 l of permeate. There are obtained 25 kg of a concentrated dye solution having a dry content of 29.0% (0.12% of NaCl).

(b) 1.6 parts of $Na_2HPO_4$ and 0.8 part of $KH_2PO_4$ are added at 40° C. in the course of 10 minutes, with stirring, to 86.2 parts of the dye solution obtained under (a), and the mixture is then diluted with 10 parts of N-methylpyrrolidone and 1.4 parts of water. There is obtained a liquid preparation having a pH-value of 7.0 and the following composition:

25.0% by weight of dye,
1.6% by weight of $Na_2HPO_4$,
0.8% by weight of $KH_2PO_4$,
10.0% by weight of N-methylpyrrolidone,
62.6% by weight of water, and
<0.1% by weight of NaCl.

The resulting true solution is thinly liquid and remains unchanged during several months of storage at −10° C. to +40° C.

EXAMPLE 12

Repeating the preceding examples with the crude dye of the formula

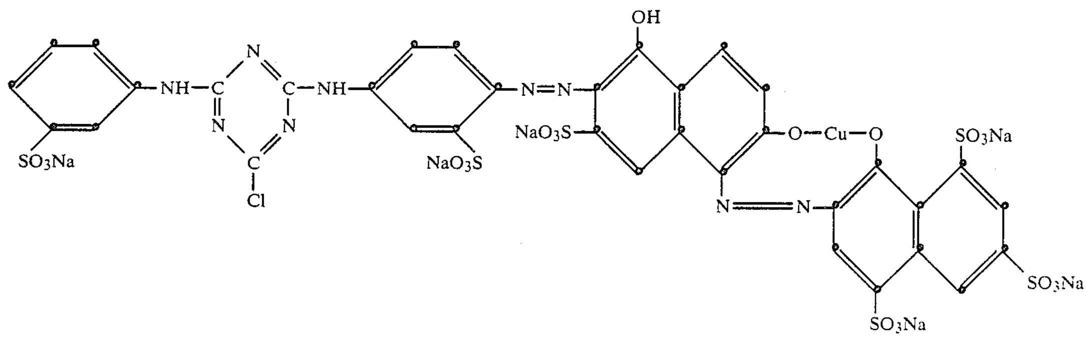

a corresponding fluid preparation having the following composition is obtained: 22.8% by weight of dye, 1.6% by weight of $Na_2HPO_4$, 0.8% by weight of $KH_2PO_4$, about 10% by weight of N-methylpyrrolidone, about 64.8% by weight of water and <0.01% by weight of NaCl.

In place of the dye indicated above, the crude dyes of the formulae indicated in Table 3 which follows can also be desalted and concentrated with the aid of reverse osmosis:

TABLE 3

| No. | Dye |
|---|---|
| 12 a | 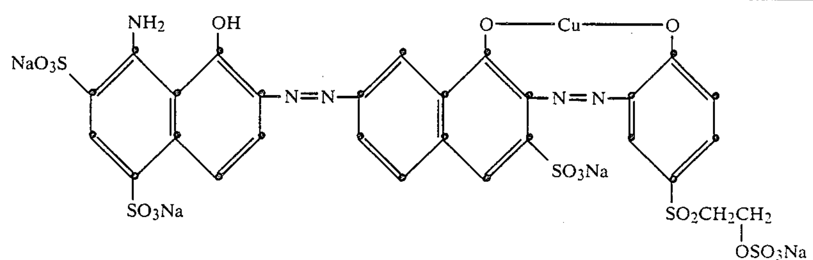 |
| 12 b | 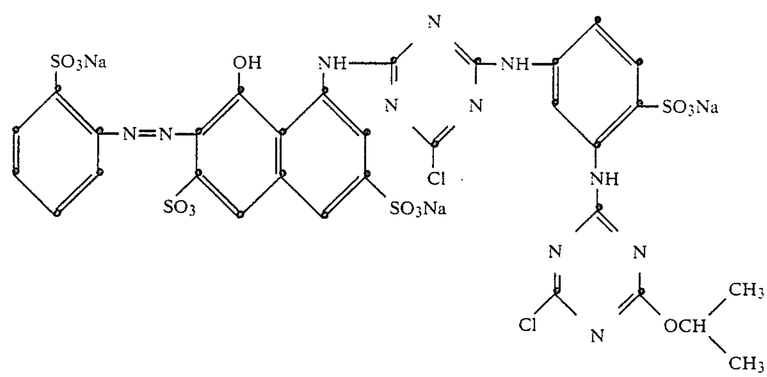 |
| 12 c | 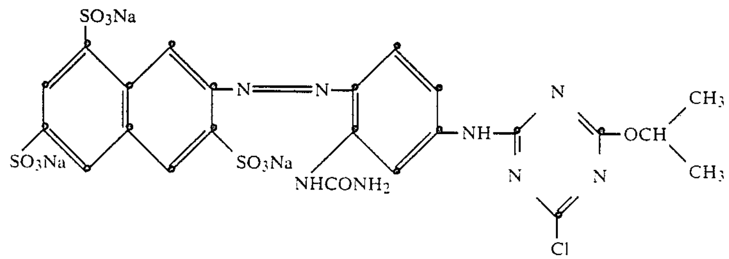 |

TABLE 3-continued

| No. | Dye |
|---|---|
| 12 d | OH, $C_2H_5$, N, N=N, NH, N, $CH_3$, OCH, $CH_3$, N, N, O, $CH_3$, $SO_3Na$, $CH_2SO_3Na$, Cl |
| 12 e | $CH_3$, N=N, NH, N, $OCH_2CH_2$—$OC_2H_5$, N, OH, $SO_3Na$, N, N, N, Cl, Cl, Cl, $SO_3Na$ |
| 12 f | $SO_3Na$, $CH_3$, $H_2N$, NH, NH, N, $OCH_2$—$CH_2$—$OC_2H_5$, N, N, O, O, $CH_3$, $CH_3$, $SO_2Na$, Cl |
| 12 g | $SO_3Na$, $NH_2$, OH, N=N, N=N, NH, N, F, N, $SO_3Na$, $SO_3Na$ $SO_3Na$, Cl, $SO_3Na$, F |
| 12 h | $SO_3Na$, OH, NHCO, NH, N, F, N=N, N, Cl, F, $SO_3Na$, $SO_3Na$, $SO_3Na$ |
| 12 i | $SO_3Na$, $NH_2$, OH, N=N, N=N, NH, N, $SO_2CH_3$, N, $SO_3Na$, $SO_3Na$ $SO_3Na$, Cl, $SO_3Na$, $CH_3$ |

TABLE 3-continued

| No. | Dye |
|---|---|
| 12 j | SO3Na, CH3, N=N, N=N, NH, N, Cl, N, N, CH3, SO3Na, SO3Na, Cl |
| 12 k | OH, C2H5, N, N=N, NH, N, Cl, N, N, O, CH3, SO3Na, SO3Na, CH2SO3Na, Cl |
| 12 l | N, CH3, N=N, NH, Cl, N, N, N, OH, SO3Na, N, Cl, Cl, Cl, SO3Na |
| 12 m | SO3Na2, CH3, N, F, H2N, NH, CH2—N, CH3, N, O=, =O, CH3, CH3, Cl, CH2SO3Na, F |
| 12 n | N, SO3Na, OH, NH, Cl, N, N, N=N, Cl, SO3Na, SO3Na |
| 12 o | N, Cl, SO3Na, OH, NH—CO, N=N, N, Cl, SO3Na, SO3Na |

TABLE 3-continued

| No. | Dye |
|---|---|
| 12 p | 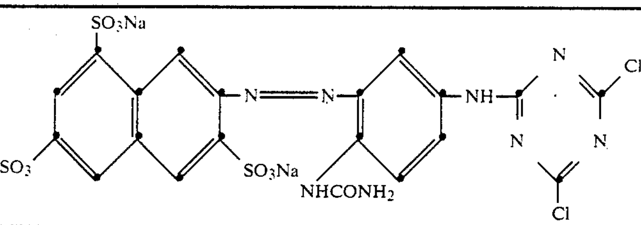 |

The fluid formulations, prepared from the dye concentrates by the addition of $Na_2HPO_4$, $KH_2PO_4$, N-methylpyrrolidone and, if desired water, are mobile and change only insignificantly after 4 weeks at $-10°$ C. to $+40°$ C.

EXAMPLE 13

(a) A stock thickening is prepared as follows:

500 kg of 5% Na alignate solution of high viscosity are thoroughly mixed with 125 kg of urea, 12.5 kg of sodium nitrobenzenesulfonate, 75 kg of 25% sodium carbonate solution and 287.5 kg of water in a container by means of an agitator.

(b) 200 g of the fluid formulation of the reactive dye indicated in Example 9 are then manually stirred into 800 g of this stock thickening. This gives a ready-to-use homogeneous printing paste. A fabric of mercerised, bleached cotton is printed with a part of this printing paste.

20 g of the remainder of the printing paste are weighed and mixed, again manually, with 980 g of the above stock thickening, and this mixture is used in the same way for printing a fabric of mercerised, bleached cotton.

After drying, the two prints are fixed in saturated steam and then rinsed in cold and hot water.

The first print results in a deep, bright and level colour motif, and the second print results in a pastel-shade, absolutely speck-free and level motif.

EXAMPLE 14

A stock thickening is prepared as follows: 37.5 g of a 12.5% aqueous solution of a condensation product obtained from 1% of hexamethylene diisocyanate and 99% of the addition product of 1 mol of oleyl alcohol and 80 mols of ethylene oxide, 125 g of urea, 282 g of water and 75 g of 25% sodium carbonate solution are initially introduced and the mixture is slowly emulsified with 218 g of gasoline (boiling range: 120°-180° C.) using a high-speed stirrer. 12.5 g of sodium nitrobenzenesulfonate and 250 g of 5% sodium alginate solution are then added.

800 g of this stock thickening are then used in the same way as indicated in Example 13(a). Textile prints of equally good quality are likewise obtained.

EXAMPLE 15

Analogously to Example 13, the following stock thickening is prepared: 1248 g of water, 160 g of urea, 32 g of sodium bicarbonate and 16 g of sodium nitrobenzenesulfonate are pre-dissolved, or dispersed, using a moderately fast stirrer.

Subsequently, 144 g of a thickener consisting of swellable, non-ionic, crosslinked polymers of a molecular weight of $5-15\times10^6$, which substantially do not dissolve in water and were prepared by polymerising ethylenically unsaturated monomers with the addition of small amounts of a crosslinking agent, are then added with further stirring.

Using 800 g of this stock thickening, as indicated in Example 13(a), and using the preparation from Example 10 or Example 12, print pastes are obtained which are outstandingly suitable for printing cellulose fibre material.

EXAMPLE 16

(Dyeing Procedure)

240 parts of the fluid dye preparation obtained from Example 10 are dissolved in 1000 parts of water. A cotton fabric which has been thoroughly pretreated to increase the wettability is impregnated at room temperature with the resulting solution to a liquor pick-up of about 70% and then dried.

The fabric is then impregnated with a warm solution of 20° C. which contains, per liter, 16 g of sodium hydroxide and 250 g of sodium chloride, and squeezed out to a pick-up of about 80%. The dyeing is steamed for 60 seconds at 102° C., rinsed, soaped for a quarter of an hour in a 0.3% boiling solution of a non-ionic detergent, rinsed (hot and cold) and dried.

A level red dyeing having good fastness properties is obtained.

What is claimed is:

1. A process for the preparation of storage-stable concentrated fluid dye compositions of water-soluble dyes, wherein an aqueous solution or suspension which, contains 10 to 60% by weight of at least one anionic crude dye is passed over an asymmetrical semi-permeable membrane containing ionic groups and having a pore diameter of 1 to 500 Å, to remove salts and synthesis by-products of molecular weights less than 500 and to partially remove water, and mixed with 15 to 85% by weight of a water-miscible organic solvent and, before or after or both before and after passage over the semi-permeable membrane.

2. A process according to claim 1, wherein the membrane consists of a cellulose acetate base structure which is modified by reaction with an ionic compound having reactive groups.

3. A process according to claim 2, wherein the membrane contains sulfonic acid groups, carboxylic acid groups or ammonium groups as ionic groups.

4. A process according to claim 2, wherein the membrane contains radicals of a water-soluble reactive dye as radicals having ionic groups.

5. A process according to claim 1, wherein the membrane consists of a cellulose acetate base structure which is modified by reaction with a polyfunctional monomeric compound, a polyfunctional polymer and an ionic compound having reactive groups.

6. A process according to claim 5, wherein the polyfunctional polymer possesses aliphatic or aromatic amino groups, hydroxyl groups, thiol groups, isocyanate groups, thioisocyanate groups or mixtures thereof.

7. A process according to claim 6, wherein the polyfunctional polymer is derived from polyethyleneimine, polyvinyl alcohol, cellulose derivatives or polyvinylaniline.

8. A process according to claim 1, wherein the membrane consists of a base structure which contains polyacrylonitrile or a copolymer of acrylonitrile and other ethylenically unsaturated monomers, which is modified by reaction with hydroxylamine and subsequent reaction with a polyfunctional monomeric compound, a polyfunctional polymer and an ionic compound having reactive groups.

9. A process according to claim 8, wherein the proportion of acrylonitrile units in the base structure of the membrane is at least 5% and preferably at least 20%.

10. A process according to claim 9, wherein the base structure of the membrane contains a copolymer of acrylonitrile with vinyl acetate, a vinyl ether, vinylpyridine, vinyl chloride, styrene, butadiene, acrylic acid, methacrylic acid, maleic anhydride, 2-aminomethyl methacrylate or an allyl compound, or a terpolymer or tetrapolymer based on acrylonitrile.

11. A process according to claim 1, wherein the concentrated aqueous composition obtained after passage over the semi-permeable membrane is mixed directly with the organic solvent.

12. A process according to claim 11 wherein said composition is mixed directly with the organic solvent and further additives.

13. A process according to claim 1, wherein the concentrated aqueous composition obtained after passage over the semi-permeable membrane is dried, and the dry dye is then mixed with an organic solvent.

14. A process according to claim 13 wherein said dry dye is mixed with an organic solvent and further additives.

15. A process according to claim 1, wherein the water-miscible solvent used is one of the following materials which are liquid at room temperature: polyhydric alcohols or their ethers or esters, ketones which can be substituted by hydroxyl groups, aliphatic and cyclic monoalcohols, cyclic ethers and esters, lactams, lactones, esters of aliphatic hydroxycarboxylic acids, derivatives, which can be substituted in the α- and/or β-position by alkyl or hydroxyalkyl groups, of 2,5-dihydrothiophene-1,1-dioxide or of tetrahydrothiophene-1,1-dioxide, dimethyl sulfoxide, low-molecular aliphatic carboxylic acids, amides of low-molecular aliphatic carboxylic acids, methylated amides of carbonic acid or phosphoric acid, phosphoric acid esters, phosphonic acid esters, alkanolamines or mixtures of the above.

16. A process according to claim 15, wherein the solvent used is a liquid, polyhydric alcohol, an ether or ester thereof or a mixture of said solvents.

17. A process according to claim 16, wherein the solvent used is ethylene glycol, propylene glycol, diethylene glycol, triethylene glycol, ethylene glycol monoethyl ether, diethylene glycol monoethyl ether or a mixture of said solvents.

18. A process according to claim 15, wherein the solvent used is a monoalcohol which can contain ether groups, in particular isopropyl alcohol or tetrahydrofurfuryl alcohol.

19. A process according to claim 15, wherein the solvent used is a ketone, hydroxyketone, lactam or lactone, a nitrile which can contain hydroxyl groups, or an ester of an aliphatic hydroxycarboxylic acid.

20. A process according to claim 15, wherein the solvent used is diacetone-alcohol, γ-butyrolactone, tetramethylurea, dimethyl sulfoxide, hexamethylphosphorotriamide or dimethyl methylphosphonate or a mixture of said solvents.

21. A process according to claim 15, wherein the solvent used is a low-molecular aliphatic-carboxylic acid.

22. A process according to claim 15 wherein the solvent used is at least one water-soluble organic solvent having a boiling point of not less than 80° C.

23. A process according to claim 1, wherein surfactants, alkanolamines, solubilising agents, anti-foam agents, acids, bases, or substances which inhibit fungal or bacterial growth, are used as further additives.

24. A process according to claim 23, wherein a surfactant is used.

25. A process according to claim 24, wherein the surfactant used is a mixture of assistants, consisting of the reaction product of 5 mols of ethylene oxide with 1 mol of 2-ethylhexanol, or the reaction product of 8 mols of ethylene oxide with 1 mol of o-phenylphenol, mixed with the reaction product of coconut fatty acid and 2 mols of diethanolamine, the reaction product of stearic acid and 2 mols of diethanolamine or the ammonium salt of the acid sulfuric acid ester of the addition product of 2 mols of ethylene oxide with 1 mol of p-tert.-nonylphenol.

26. A storage-stable, concentrated fluid dye composition of water-soluble anionic dyes, which has been obtained by the process of claim 1.

27. A dye composition of water-soluble dyes, according to claim 26, which contains 10 to 60% by weight of at least one anionic dye and 15 to 85% by weight of a water-miscible solvent.

28. The composition according to claim 21 which contains 5 to 50% by weight of water and 1 to 40% by weight of further additives.

29. The composition of claim 21 which is devoid of water or further additives.

30. A dye composition of water-soluble dyes, according to claim 27 which contains 15 to 45% by weight of at least one anionic dye and 20 to 80% by weight, of a water-miscible solvent.

31. The composition of claim 30 which contains 20 to 30 percent by weight of water and 15 to 35% by weight of further additives.

32. The composition of claim 30 which is devoid of water or further additives.

33. A dye composition according to claim 26, which contains not more than 1% by weight, relative to the fluid composition, of inorganic inert salt.

34. A dye composition according to claim 33, which contains not more than 0.5% by weight, relative to the fluid composition, of inorganic inert salt.

35. A dye composition according to claim 33, which contains not more than 0.1% by weight, relative to the fluid composition, of inorganic inert salt.

36. A dye composition according to claim 26, which contains the dye of the formula

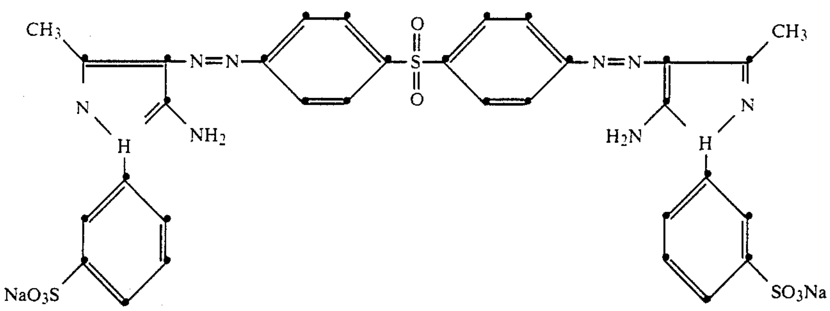
37. A process for dyeing and printing natural or synthetic fibre materials, wherein the fluid dye composition according to claim 26 is used to prepare a padding liquor, dye bath, print paste or spray solution.
38. The process of claim 1 wherein said aqueous solution or suspension is dried after passage over said membrane.
* * * * *

UNITED STATES PATENT AND TRADEMARK OFFICE

CERTIFICATE OF CORRECTION

PATENT NO. : 4,500,321

DATED : February 19, 1985

INVENTOR(S) : Beat Bruttel, et al

It is certified that error appears in the above-identified patent and that said Letters Patent is hereby corrected as shown below: On the title page Page 1, "Inventors:" — Line 1, delete "Paul Hugelshofer, Muttenz;"
Lines 3 and 4 delete "Roger Lacroix, Village-Neuf, France"

Col. 8, line 38 — Correct spelling of "group" second instance

Col. 12, line 9 — Correct spelling of "asymmetric"

Col. 12, line 41 — Correct spelling of "liquors"

Col. 14, line 10 and Col. 33, line 1 — Delete upper left of formula and substitute:

-- $CH_3$ N N $NH_2$ -- ;

end of formula, delete upper right and substitute:

-- 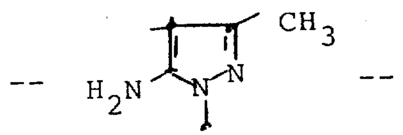 --

Col. 14, line 34 — Delete "dry" and substitute --dye--

Col. 14, line 42 — Delete "by" and substitute --of--

Col. 15, line 20 — Correct spelling of "months"

UNITED STATES PATENT AND TRADEMARK OFFICE
CERTIFICATE OF CORRECTION

PATENT NO. : 4,500,321

DATED : February 19, 1985

INVENTOR(S) : Beat Bruttel, et al

It is certified that error appears in the above-identified patent and that said Letters Patent is hereby corrected as shown below:

| | |
|---|---|
| Col. 20, Table 2, 3rd col., 7th line after heading | Delete "1.9%" and substitute --1.19%-- |
| Col. 20, Table 2, 5th col., line 1 after heading | After "93%" insert --*-- |
| Col. 28, Table 3, Formula "12j" | Delete end of formula and substitute: |

-- 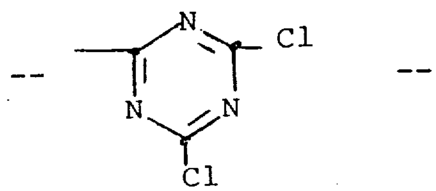 --

Signed and Sealed this

*Sixth* Day of *August 1985*

[SEAL]

*Attest:*

DONALD J. QUIGG

*Attesting Officer* *Acting Commissioner of Patents and Trademarks*